United States Patent [19]

Pavlovic et al.

[11] Patent Number: 5,680,031
[45] Date of Patent: Oct. 21, 1997

[54] METHOD AND APPARATUS FOR CHARGING BATTERIES

[75] Inventors: Vladimir S. Pavlovic, Mississauga; Jiri K. Nor; Robert B. Field, both of Oakville, all of Canada

[73] Assignee: Norvik Traction Inc., Mississauga, Canada

[21] Appl. No.: 621,930

[22] Filed: Mar. 26, 1996

[51] Int. Cl.⁶ ............................................. H02J 7/00
[52] U.S. Cl. ..................... 320/21; 320/22; 320/48; 320/30; 320/39
[58] Field of Search ........................... 320/21, 22, 23, 320/24, 48, 30, 31, 32, 39; 324/430, 429, 433

[56] References Cited

U.S. PATENT DOCUMENTS

| | | | |
|---|---|---|---|
| 2,666,883 | 1/1954 | Guelpa | 320/23 |
| 4,385,269 | 5/1983 | Aspinwall et al. | 320/21 X |
| 4,736,150 | 4/1988 | Wagner | 320/21 |
| 4,829,225 | 5/1989 | Podrazhansky et al. | 320/21 X |
| 4,959,597 | 9/1990 | Heavey et al. | 320/21 X |
| 5,179,335 | 1/1993 | Nor | 320/21 |
| 5,204,611 | 4/1993 | Nor et al. | 320/21 |
| 5,352,967 | 10/1994 | Nutz et al. | 320/21 |
| 5,352,968 | 10/1994 | Reni et al. | 320/48 X |
| 5,408,170 | 4/1995 | Umetsu et al. | 320/22 X |
| 5,481,174 | 1/1996 | Martin et al. | 320/21 X |
| 5,500,584 | 3/1996 | Shimomoto | 320/20 |

FOREIGN PATENT DOCUMENTS

432690 A2  6/1991  European Pat. Off. ........... H02J 7/10

*Primary Examiner*—Peter S. Wong
*Assistant Examiner*—K. Shin
*Attorney, Agent, or Firm*—Ridout & Maybee

[57] ABSTRACT

A charger for charging a rechargeable battery. The charger comprising a circuit for producing a charging current having a variable level and a control circuit for controlling the charging current. During a first charging period the current is maintained at a level to rapidly charge the battery at a rate in amperes which is greater than the capacity of the battery in ampere-hours. The controller includes means for interrupting the charging current for a predetermined interruption interval. During the interruption interval, the charging current is maintained at a non-zero value. The controller also includes means for determining a resistance free voltage for the battery. During a subsequent charging period, the charging current is controlled in response to the value of the resistance free voltage.

33 Claims, 8 Drawing Sheets

SYSTEM ARCHITECTURE

METHOD AND APPARATUS FOR CHARGING BATTERIES

FIELD OF THE INVENTION

The present invention relates to battery charging, and more particularly to a method and apparatus for charging a battery.

BACKGROUND OF THE INVENTION

Batteries are devices that convert the chemical energy contained in active materials directly into electrical energy by means of an oxidation-reduction electrochemical reaction involving the transfer of electrons from one material to another. Batteries are characterized as primary batteries and secondary batteries. Both types of batteries are widely used. Secondary batteries are particularly popular because they can be recharged, i.e. restoring the state of the battery.

Rechargeable or secondary batteries are recharged using chargers which fall into two broad classes: simple chargers and closed loop or feedback chargers. Simple chargers deliver a low level charge current to the battery over a timed interval. The current level is chosen to prevent damage to the battery due to overcharging. Feedback chargers, on the other hand, monitor the state of the battery in order to control the magnitude of the charge current during the charge cycle. The charge cycle is composed of a high current phase and a regulation phase. During the high current phase, the feedback charger applies a high charge current to the battery in order to rapidly charge the battery. The feedback charger continues to monitor the state of the battery and reduces the charging current as the charge state of the battery is restored.

The capacity and cycle life expectations of batteries depend on many different factors. Charge parameters are particularly important and strongly influence the battery capacity.

In U.S. Pat. Nos. 5,179,335 and 5,204,611, assigned to the common assignee of the present application, a novel battery charger for charging rechargeable batteries is disclosed. The battery charger according to the previous invention supplies a charging current to a rechargeable battery at a rate in amperes greater than the capacity in ampere-hours of the battery, i.e. 1C, in order to rapidly charge the battery. The battery charger includes means for detecting the internal resistance free voltage of the rechargeable battery being charged and comparing the voltage to a pre-selected reference voltage which is independent of the battery being charged. According to the previous invention, the resistance free voltage is compared to the reference voltage at an instant in time when the charging current has been interrupted. In the prior invention, the charging current is reduced when the internal resistance free voltage exceeds the reference voltage in order to reduce the rate of charging to maintain the internal resistance free voltage at a level equivalent to the pre-selected reference voltage. Further variations on the battery charger include providing temperature compensation, controlling the charge cycle to alleviate the undesirable effect of thermal runaway, and providing a finishing charge current to bring the state of charge held by the battery fully to 100%.

In the prior art, Burkett et al. (U.S. Pat. Nos. 3,517,293; 3,587,673; 3,609,503; 3,614,583) describes apparatus and method for battery charging. The method taught by Burkett comprises applying a charging current having a magnitude in excess of the nominal 1-hour rate of the cells that make up the battery and intermittently discharging the battery at a rate which is also in excess of the nominal 1-hour rate. Burkett teaches that the purpose of the intermittent discharge is to depolarize the battery and thereby enhance chargeability. Burkett also teaches that applying a de-charging current (i.e. negative current) to depolarize the battery makes it possible to apply a much higher charging current even as the full charge condition is reached. As a result, the time required to fully charge a battery can be dramatically shortened according to Burkett.

In U.S. Pat. No. 4,746,852, Martin discloses a controller for a battery charger wherein a short-length discharge pulse is applied after each charging pulse. The purpose of the discharge pulse is to negate polarization and electrolysis. According to Martin, the total charge time is reduced and there is less deterioration as a result of the lower polarization and electrolysis.

Similarly in PCT Application No. PCT/US93/00569, Feldstein teaches using a reverse charging current that provides both long and short reverse pulses to the cell being charged. According to Feldstein, the charger provides short charge pulses to the cell and withdraws discharge pulses having a duration less than the charge pulses. Feldstein also teaches periodically terminating the charging process followed by a continuous charge pulse of about 0.5 to 1.0 seconds.

In U.S. Pat. No. 4,829,225, Podrazhansky et al. teach the use of a discharge pulse and the importance of a rest period before or after the discharge pulse. The duration of the discharge pulses may vary during the charging process. In PCT Application no. PCT/US93/00471, Podrazhansky teaches the use of one or more charging pulses, separated by waiting periods, and followed by a series of discharging pulses also separated by waiting periods. According to Podrazhansky, the time required to recharge the battery can be reduced by applying a discharging (i.e. de-polarizing) pulse between charging pulses. A further reduction in the charging time, along with heating of the battery, can be obtained by waiting for a specified period after the end of the discharge pulse before applying the discharge pulse.

In view of the foregoing, the prior art approach entails various combinations of charging and discharging (i.e. negative) pulses, combined with rest or wait periods, to increase the rate of charge and minimize the heating effect. In other words, the prior art teaches applying both charging and discharging pulses during the process of charging a battery.

It has been found that the various combinations of charge and discharge pulses, combined with rest periods, as taught by the prior art actually decrease the charging rate of the battery and lead to excessive heating of the battery. Further it has been found that hererogenous reaction kinetics and mass transport mechanisms greatly influence the charging rate. In the case where the transport of reactants is the rate limiting factor, interrupting and reversing the flow of reactants decreases the net transport flux resulting in a decrease in the charge rate. Thus the application of one or more charge pulses, followed by one or more discharge pulses, as taught by the prior art decreases the charging rate of the battery and increases the heating of the battery. Such effects are clearly undesirable.

Observations suggest that prior art charging methods lead to Reversible Capacity Decay (RCD). The utilization of discharging pulses has also been found to be harmful to batteries by causing unnecessary battery heating and electrically induced mechanical stress exhibited in EM fields and capacitor charging effects. Furthermore, the use of discharging pulses increases the charging time of battery and adds to the complexity of the charging device which is undesirable from a practical point of view.

A known method of restoring full capacity involves an equalization cycle in which the battery cells are subjected to a slight overcharge to equalize all the cells in a fully charged state. While running an equalization cycle can restore the battery cells to a fully charged state, the resultant overcharging of cells has the tendency to shorten the cycle life and can also reduce capacity over time.

Accordingly, there remains a need for a method and apparatus for charging a battery which overcomes the disadvantages associated with the prior art including the problem of reduced capacity over repeated charging cycles.

BRIEF SUMMARY OF THE INVENTION

The present invention provides a method and apparatus for charging batteries.

In accordance with the present invention, it has been found that heterogenous reaction kinetics and mass transport mechanisms play an important role in the charging process. In the case where transport of reactants is the rate limiting factor, the interruption and reversal of the reactant flow (i.e. the charging current) decreases the net transport flux which in turn decreases the charge rate.

It has been found that during the high current charge period, the battery charge acceptance ability exceeds the charging current, and the rate of charge is determined by the average value for the charging current. During this segment of the charging cycle, the charging current is limited by the charger to a value which is safe for the battery interconnections and internal wiring. During the regulation phase of the charging cycle, it has been observed that the charge acceptance ability of the battery is determined by either the surface chemical reaction or the mass transport through the diffusion boundary layer in the electrolyte. This means that reversing the charging current will cause the net surface chemical reaction rate and the net transport flux through the boundary layer to decrease.

It has also been found that surface chemical reaction starts around certain active sites on the plate, and continues at the sites with active material build-up until the reaction is terminated. When resumed, the surface chemical reaction will start around different sites on the plate.

In accordance with the present invention, a regulated charging current is applied to the battery. The charging current is interrupted by periodically reducing the magnitude, but preferably not to zero, and then increasing to the charge value. A charging current according to the present invention features optimal charge delivery without overcharging, but does not reduce the active surface area of the reaction. According to the invention, the regulation of the magnitude of the charging current is based on maintaining the "resistance free" voltage of the battery at a predetermined value. The resistance free voltage is either measured when the current is interrupted or calculated from the battery internal resistance without interrupting the current.

The method of charging according to the present invention provides significant benefits over known charging techniques. Firstly, the switching of the charging current prevents local overcharging by causing the surface reaction to terminate and resume around different sites of the plate. Secondly, by maintaining a positive charging current, the method according to the present invention promotes active surface formation and therefore higher discharge capacity. The prior art teaches turning off or reversing the charging current. It has been observed that such an approach results in a crystal structure which lowers the discharge capacity.

Another feature of the present invention is a significant reduction in the Reversible Capacity Decay (RCD) commonly experienced.

In a first aspect, the present invention provides an apparatus for charging a rechargeable battery, said apparatus comprising: generator means for generating a charging current having a variable level, and during a first charging period said current having a level to rapidly charge the battery at a rate in amperes greater than the capacity in ampere-hours of the battery; controller means for controlling said generator means, said controller means including, (a) means for interrupting said charging current for a predetermined interruption interval and during said interruption interval said charging current being maintained at a non-zero value; (b) means for determining a resistance free voltage value for the battery during said interruption interval; (c) means for comparing a reference voltage to said resistance free voltage value for the battery; and (d) means for controlling the level of said charging current in response to said resistance free voltage.

In another aspect, the present invention provides a method for charging a rechargeable battery comprising the steps of: (a) generating a charging current having a variable level; (b) maintaining said charging current during a first charging period at a level to rapidly charge the battery at a rate in amperes greater than the capacity in ampere-hours of the battery; (c) interrupting said charging current for a predetermined interruption interval; (d) maintaining said charging current at a non-zero value during said interruption interval; (e) determining a resistance free voltage value for the battery after said interruption; and (f) varying the level of said charging current in response to said resistance free voltage value determined in step (e).

In yet another aspect, the present invention provides a method for determining a resistance free voltage value during the charging cycle when a charging current is applied to a rechargeable battery, said method comprising the steps of: (a) interrupting said charging current for an interruption interval; (b) inputting high and low voltage readings and high and low current readings for the battery during said interruption interval; and (c) calculating a resistance free voltage value from said input voltage and current readings according to the expression:

$$V_{RF} = V_{Hi} - \frac{I_{Hi}(V_{Hi} - V_{Low})}{(I_{Hi} - I_{Low})} .$$

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
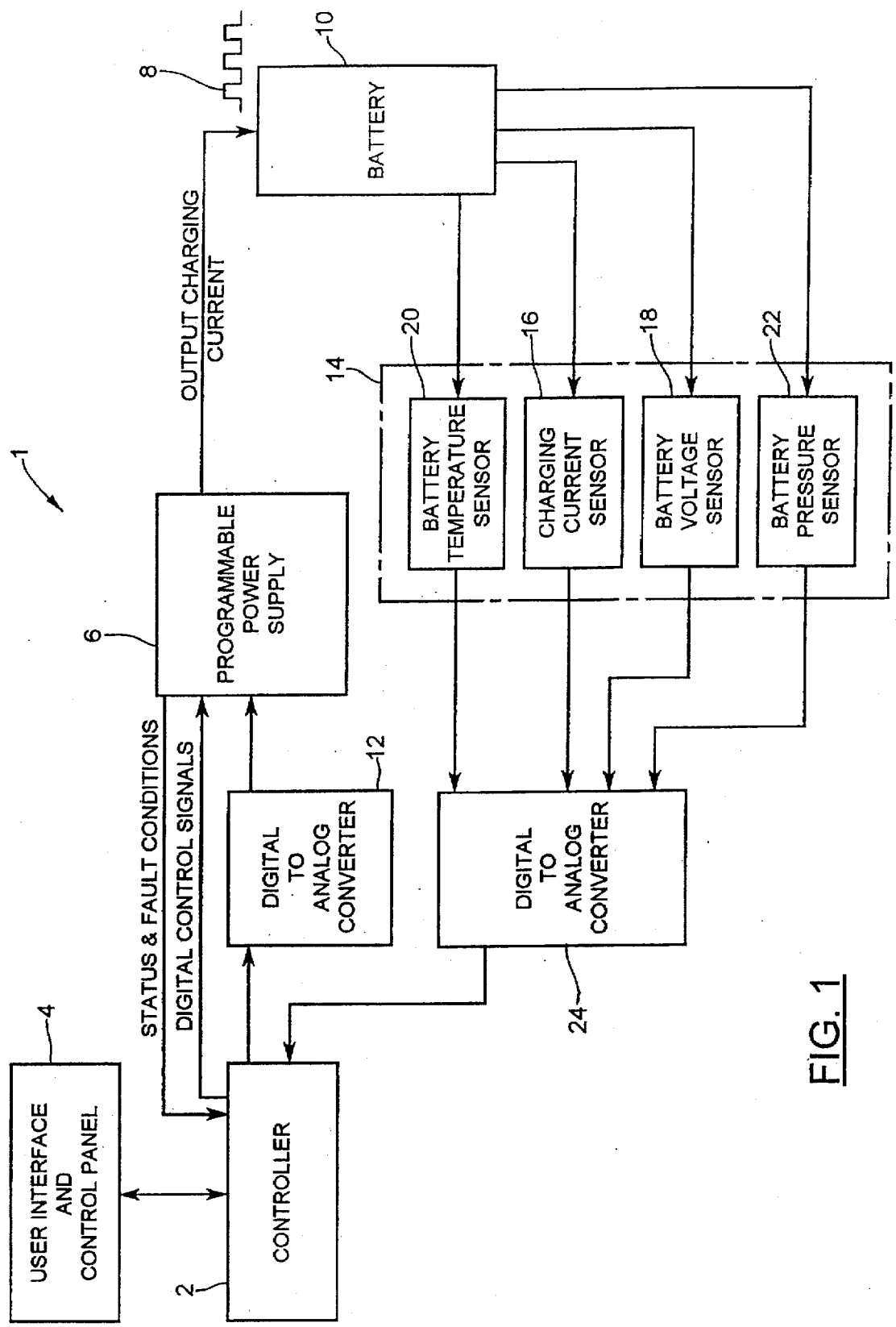
FIG. 1 is a block diagram showing an apparatus for charging a battery according to the present invention.

Reference is made to FIG. 1 which shows in block diagram a battery charger 1 according to the present invention.

The charger 1 comprises a controller 2, a user control interface and display panel 4, and a programmable power supply 6.

The programmable power supply 6 generates a charging current I indicated by reference 8 for charging a battery 10 which couples to the charger 1. The controller 2 is coupled to an analog input on the programmable power supply 6 through a digital-to-analog converter (D/A) 12. The D/A converter 12 provides an analog control signal output to the power supply representing the relative level of the charging current I to be applied to the battery 10. The analog input accepts a control voltage from the D/A converter 12 in the range 0 to 10 VDC. The control voltage signal represents a range of 0% to 100% of the full scale output current capacity of the programmable power supply 6. The programmable supply 6 also includes a buffered digital input/output interface coupled to respective output and input ports on the controller 2. The power supply 6 receives digital control signals issued by the controller 2 for setting the charging current I ON/OFF and for clearing a FAULT condition. Preferably, the power supply 6 accepts a digital input signal from the controller 2 which causes the instantaneous shutdown to 0% output charging current I. The power supply 6 also outputs digital signals to the controller 6 to indicate status and fault conditions, for example, over-temperature, and DC bus voltage too high or too low. One skilled in the art will be familiar with the implementation of the programmable power supply 6.

The controller 2 comprises a microprocessor, or processor board, which has been suitably programmed to execute a battery charging program and method according to the present invention. The charging process is configured by parameters which are entered through the user interface and display panel 4. The user interface and display panel 4 preferably comprise a display and a keyboard, or keypad, for entering battery charge parameters. The user interface 4 may also include an input device for reading a battery parameter identifier which is associated with certain known types of batteries.

The controller 2 uses the display panel 4 to display battery status, charging system status, fault conditions, and diagnostic information to the user. The panel 4 also includes control inputs to start/stop the battery charging process, and display prompts for connecting the battery 10 to the charger 1 and configuring the operation of the charger 1.

The charger 1 operates as a closed loop or feedback charging system. The charger 1 has a sensor block 14 for monitoring various parameters of the battery 10. The sensors include a charging current sensor 16, a battery voltage sensor 18, a battery temperature sensor 20, and a battery pressure sensor 22. The sensors comprise analog process measurement circuits and are coupled to respective input ports on the controller 2 through an analog-to-digital converter 24.

The charging current sensor 16 monitors the charging current I and is implemented using a current transducer, such as LEM Module LT 500 available from LEM S.A. of Switzerland, connected to a load resistor and an analog conditioning amplifier (not shown). One skilled in the art will be familiar with the implementation of the analog circuitry. The battery voltage sensor 18 monitors the output voltage of the battery 10 and preferably comprises a scalable signal conditioning amplifier (not shown) having galvanic isolation, for example, provided by an opto-coupler (not shown). The battery temperature sensor 20 monitors the internal temperature of the battery 10 and is implemented using a solid state thermal sensor which is in contact with the exterior wall of the battery 10. A suitable temperature sensor is the LM335A solid state device available from National Semiconductor. The sensor 20 may include an analog conditioning amplifier (not shown) to condition the output signal from the temperature sensor. The battery pressure sensor 22 monitors the internal pressure of the battery 10 and is implemented using a suitable pressure transducer such as the PX302 available from Omega Engineering Inc. The output signals from the various sensors are fed into the A/D converter 24 and digitized for input by the controller 2. Preferably, the A/D converter 24 comprises a high speed 12-bit converter.

The digitized signals inputted to the controller 2 are used by the battery charging program and method in conjunction with battery and charge parameters inputted by the user. In response to the inputs, the battery charger control program calculates and updates the control commands for the programmable power supply 6. The control program also continues to monitor the status and operation of the programmable power supply 6. If any faults are detected, the charger control program will terminate the charging cycle, i.e. turn-off the power supply 6, and indicate the abort status on the user display panel 4. The processing steps embodied in the battery charging program and method are described in more detail below with reference to FIGS. 4 to 8.

It is a feature of the present invention that the charging current I is periodically interrupted or varied. The purpose of the variation is two-fold. First, the variation in the charging current I provides a window to measure voltage and current parameters in order to calculate a resistance free voltage $V_{RF}$ for the battery 10. Secondly, the variation in the current provides a mechanism for reducing and preventing Premature Capacity Loss (PCL) and Reversible Capacity Decay (RCD).

The controller 2 regulates the variations or interruptions in the charging current I through the programmable power supply 6 (FIG. 1). The variation in the current I includes a step change (e.g. the current is turned off, decreased to a non-zero value, or increased), a ramped change, a sinusoidal change, an exponential change, a logarithmic change, or any other suitable variation in the current I.

Figure 2A:
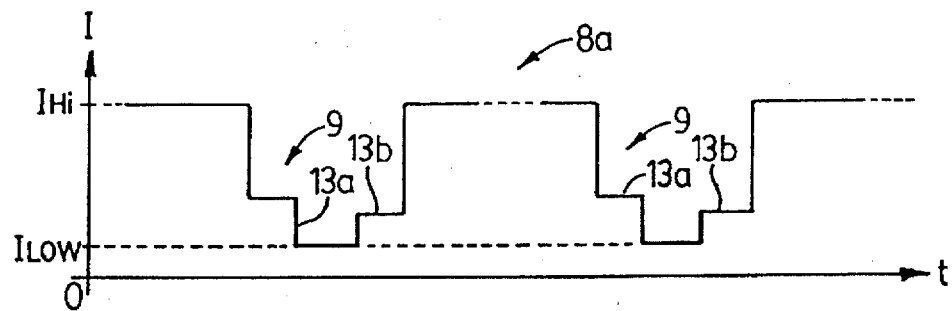
FIGS. 2(a) and 2(b) show exemplary charging currents according to the present invention.

FIG. 2 depicts exemplary waveforms 8a and 8b with a step change in the charging current I according to the present invention. The waveforms 8a,8b comprise a current with magnitude $I_{Hi}$ and transition portions denoted by references 9 and 11 respectively, and having a magnitude $I_{Low}$. For the waveform 8a, the transition portions 9 comprise a substantially square pulse with step portions 13a and 13b. The step portion 13a represents a decrease in the magnitude of the charging current I from $I_{Hi}$ and a pause, which allows for time constants associated with the electrochemistry of the particular battery being charged. The step portion 13b represents an increase in the magnitude of the charging current I from $I_{Low}$. The step portions 13a, 13b are generated when charging certain types of batteries, for example, large capacity lead-acid batteries. It will be appreciated that the magnitude of charging current I and duration at the step portions 13a, 13b will depend on the electrochemistry of the battery being charged, and for some batteries the step portions 13a, 13b will be not necessary.

Figure 2B:
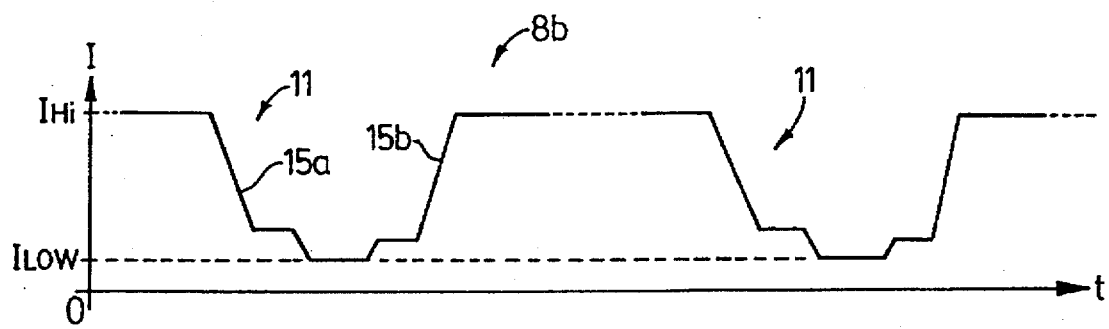

For the waveform 8b, shown in FIG. 2(b), the transition portion 11 has relaxed falling and rising edges 15a, 15b. Preferably, the edges 15a,15b have fall and rise times which are shorter than the characteristic time constants for the electro-chemical phenomena associated with the resistance free voltage $V_{RF}$. Fall and rise times in the range 0.01 C/ms to 10 C/ms are suitable. As shown in FIG. 2, it is a feature of the present invention that the low value $I_{Low}$ of the charging current I is positive. A duration for the transition portion 9 or 11 in the range 0 to 500 ms is suitable, but a duration over 500 ms is also applicable.

Referring to FIG. 2, the frequency for the transitions in the charging current I is preferably in the range 0.01 Hz to 120 Hz. It has been found that a lower frequency is preferable from the standpoint of active material utilization, and therefore in one aspect of the invention, the variation in the charging current I is linked to the state of charge for the battery 10. In operation, when the battery 10 is discharged and the battery voltage is far below the regulation point, a low frequency for the charging current I is preferable. Similarly, the sampling frequency of the battery state parameters is low at that stage of the charging cycle. As the resistance free voltage $V_{RF}$ approaches the set-point voltage $SV_r$, the sampling frequency is increased. When the set-point voltage $SV_{RF}$ is reached with temperature compensation taken into account, the frequency of the charging current I is reduced. At this point, the frequency is reduced so that the average value of the charging current I does not exceed the battery charge acceptance ability. The change in the charging current I comprises a discrete step change or a continuous current adjustment. A discrete step change causes the resistance free voltage $V_{RF}$ to drop below the set-point voltage $SV_{ref}$, and the current I remains constant until the set-point voltage is reached again. For a continuous current adjustment, the controller 2 continuously adjusts the charging current I to maintain the resistance free voltage $V_{RF}$ exactly at the set point.

Figure 4:
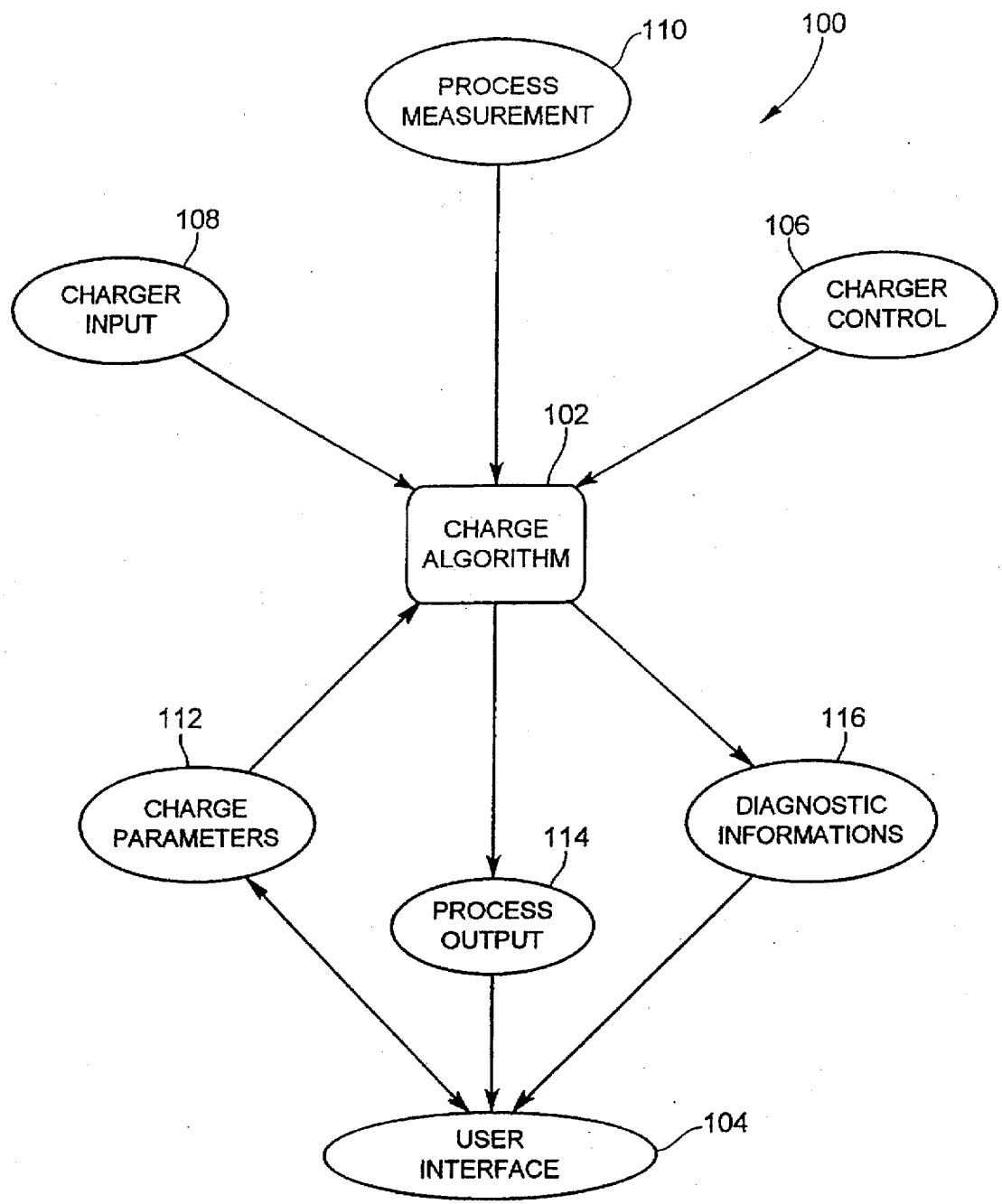
FIG. 4 shows in block diagram form a method for regulating a charging current according to the present invention.

Reference is next made to FIG. 4 which shows in block diagram form the architecture for a battery charging control program 100 according to the present invention. The battery charging control program 100 comprises a charge algorithm 102, a user interface module 104, a charger control module 106, a charger input module 108, and a process measurement module 110.

The charge algorithm module 102 comprises the method steps for controlling the charging of the battery 10 according to the present invention. The charge algorithm 102 is described in more detail below with reference to FIGS. 5 to 8.

The user interface module 104 comprises the functions which control the operation of the user control and display panel 4 (FIG. 1). The user interface module 104 processes inputs entered by the user into charge parameters 112 which are used by the charge algorithm 102 as described in more detail below. The user interface module 104 also displays data from the charge algorithm 102 on the charging process 114 and diagnostic information 116 on the display panel 4.

The charger output module 106 controls the operation of the programmable power supply 6 in response to the charge algorithm 102. The charger output module 106 provides the digital control to the D/A converter 12 to generate the control voltage signal for the programmable power supply 6. The charger output module 106 also generates the digital output signals, e.g. charge current ON/OFF and FAULT reset, to control the programmable power supply 6.

The charger input module 108 receives the status and fault condition signals issued by the programmable power supply 6. The status and fault condition signals are received on the input port of the controller 2 and transmitted to the charge algorithm 102 for processing. For example, in response to an over-temperature condition, the charge algorithm 102 aborts charging the battery, the power supply 6 is shut down through the charger control module 106, and an 'abort message' is displayed on the display panel 4 by user interface module 104.

The process measurement module 110 oversees the input of signals from the charging current, battery voltage, battery temperature and battery pressure sensors 16, 18, 20, 22 (FIG. 1). The analog outputs from the sensors are first digitized by the A/D converter 24. The digitized information obtained from the sensors is then stored in memory for use by the charge module 102 as will be described in more detail below.

Figure 5:
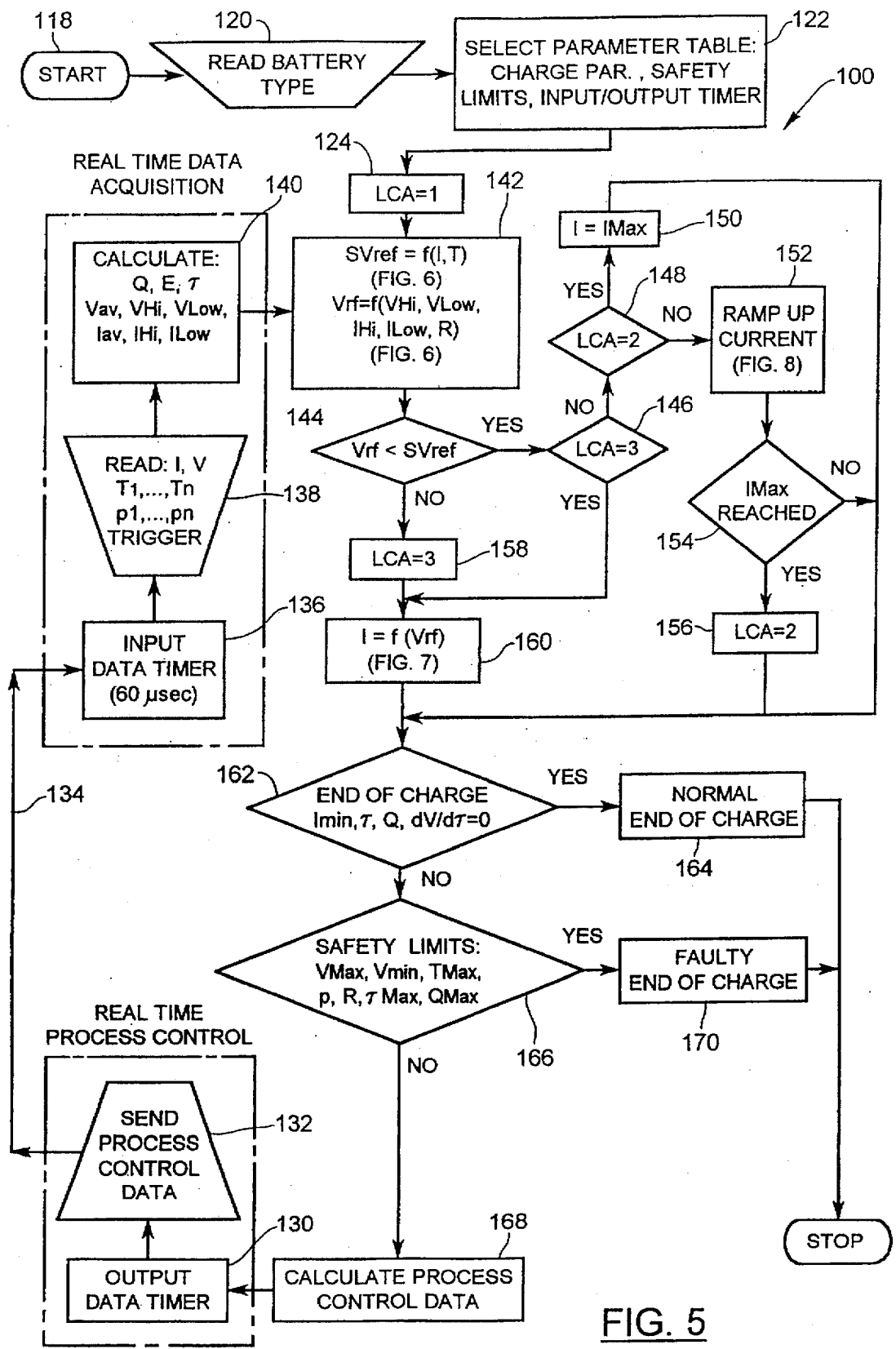
FIG. 5 is a flow chart for a charging method according to the present invention.

Reference is next made to FIG. 5, which shows the operation of the battery charger 1 and charging algorithm 102 according to the present invention.

Starting at a step 118, the battery type identifier is read in step 120 (if the charger 1 includes an input device for reading the battery identifier). If the charger 1 does not include a reader for the battery type, the user is prompted to input the battery type using the interface panel 4. The battery type, i.e. chemistry, is used to select an appropriate Parameter table in step 122. The Parameter table is dependent on the particular type of battery, e.g. nickel-cadmium, nickel-metal hybrid or lead-acid, and preferably includes parameters for first current parameter $I_1$ and second current parameter $I_2$, maximum charging current $I_{max}$, reference voltage set-points $V_{r1}$ and $V_{r2}$, and a coefficient of temperature compensation θ. The Parameter table may also include a sampling rate or resolution for the input/output timers described in more detail below. Preferably, the parameter tables for various types of batteries contemplated for the charger 1 are stored in non-volatile memory, e.g. ROM, which is accessible by the controller 2.

In step 124, a local status indicator LCA is set to ONE. The status indicator LCA is used by the program and has three states: ONE, TWO, and THREE. The state LCA=ONE indicates that the battery 10 has been connected to the charger 1 and remains to be charged. The state LCA=TWO indicates that the charging current I has reached its maximum allowable value, i.e. $I_{Max}$. The state LCA=THREE indicates that the resistance free voltage $V_{RF}$ for the battery 10 has reached the temperature compensated resistance free voltage set-point $SV_{ref}$.

As shown in FIG. 5, there are two modules 126,128 which handle the data acquisition and control command transfer, respectively, with the charger 1. The data acquisition module 126 oversees the input of data from the sensors 16 to 22 (FIG. 1). The real time process module 128 outputs the digital control signals and the current control signal (via the D/A converter 12) to the programmable power supply 6.

In step 130 of the real time process control module 128, a time-base for outputting the output control commands is generated. Next at step 132, the output control commands are sent to the appropriate hardware drivers. As shown, there is also a loop-back path 134 between the real time process control module 128 and the real time data acquisition module 126. The loop-back 134 provides a "trigger" for the real time data acquisition module 126 as described below.

Referring to FIG. 5, in step 136 the data acquisition module 126 generates a time-base for inputting, i.e. sampling, data. The sampling rate depends on the particular hardware being utilized and the desired resolution for the process control as will be appreciated by those skilled in the art. For example, sampling once every 60 μsec is suitable for the charger 1. In step 138, the data acquisition module 126 collects (at the sampling rate) current readings $I_1, \ldots I_n$ from the charging current sensor 16 (FIG. 1), voltage readings $V_1, \ldots V_n$ from the battery voltage sensor 18, temperature readings $T_1, \ldots T_n$ from the battery temperature sensor 20, and pressure readings $P_1, \ldots P_n$ from the battery pressure sensor 22.

In step 140, values for average voltage $V_{av}$, average charging current $I_{av}$, Coulombic charge Q, charge energy E, and elapsed charging time τ are calculated from the input data. The average current $I_{av}$ and average voltage $V_{av}$ values are calculated over a selected period, for example, one second. The Coulombic charge Q is calculated by integrating the values for the charging current $I_1, \ldots$ , and the charge energy E is calculated from the average current $I_{av}$ and average voltage $V_{av}$.

In step 138, data, corresponding to the high value for the charging current $I_{Hi}$, the low value for the charging current $I_{Low}$, the high value for the voltage $V_{Hi}$, the low value for the voltage $V_{Low}$, are also read in conjunction with the trigger provided on the loop-back path 134 from the real time process control module 128. The trigger for the high charging current $I_{Hi}$ comprises the output command to the programmable power supply 6 to raise the charging current I to the HIGH value. Similarly, the trigger for the low charging current $I_{Low}$ comprises the output command to the power supply 6 to lower the charging current I to the LOW value. The values for the high voltage $V_{Hi}$ and the low voltage $V_{Low}$ are read in a similar manner. The data generated by the data acquisition module 126 is stored in memory for further processing.

In step 142, two operations are performed. First, the resistance free voltage set-point $SV_r$ is compensated for temperature to give $SV_{ref}$, and second the actual resistance free voltage $V_{RF}$ is calculated. The calculations for $SV_r$ and $V_{RF}$ may be implemented as procedure or function calls from step 142, and the form of the functions will be dependent on the implementation. The logic steps for the functions are shown in more detail in FIG. 6.

Figure 6:
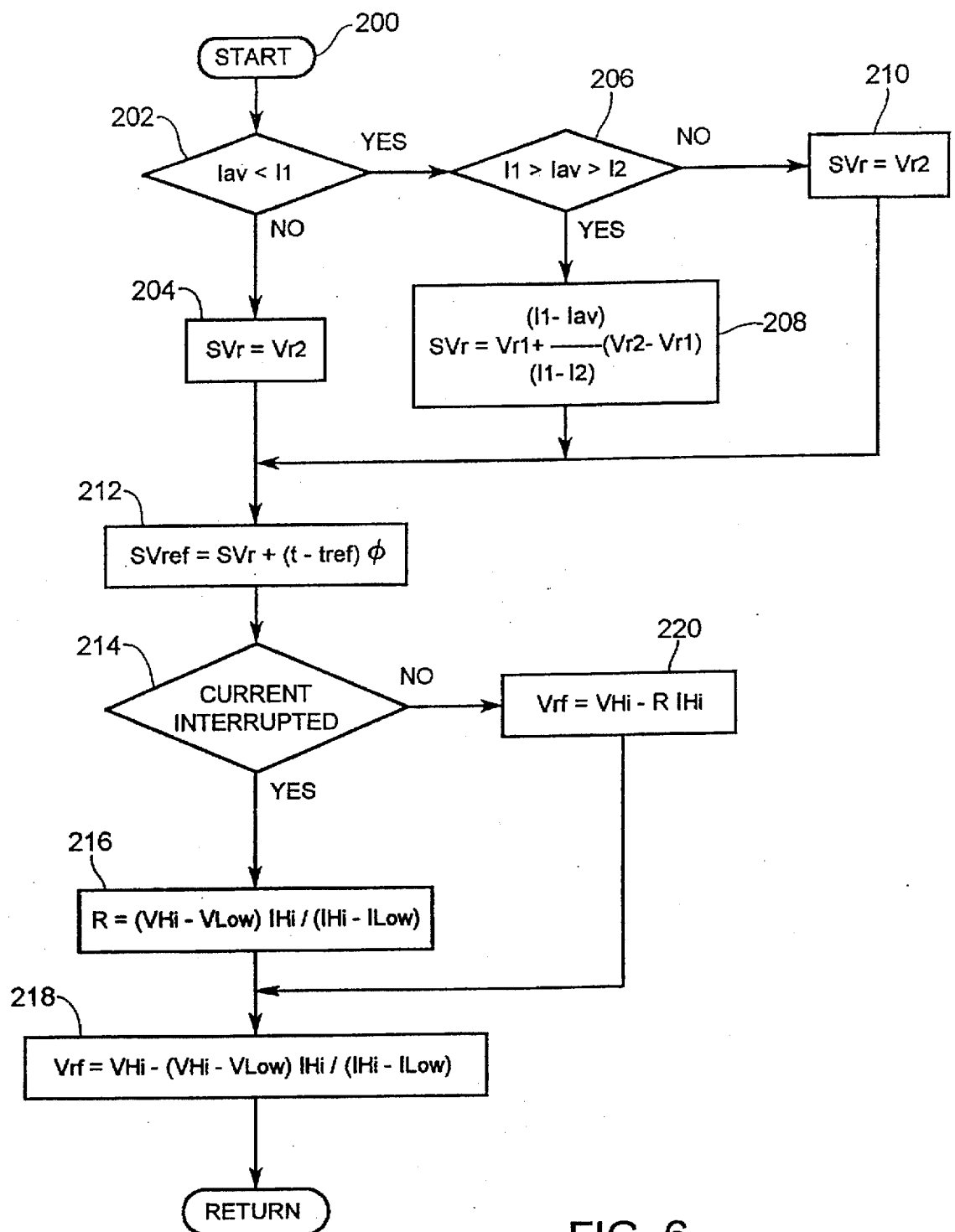
FIG. 6 is a flow chart showing an aspect of the charging method of FIG. 5.

Reference is next made to FIG. 6. Proceeding from step 200, the average current $I_{av}$ is compared to the first current parameter $I_1$ at step 202 which comprises a decision block. If the average current $I_{av}$ is greater than the current parameter $I_1$, then it is concluded that the charging process 102 is utilizing a predetermined voltage set-point $V_{r1}$ and in step 204 the resistance free voltage set-point $SV_r$ is assigned the value of $V_{r1}$ (from the parameter table). On the other hand, if a variable resistance free voltage set-point is being used, then the value of the average charging current $I_{av}$ is checked against the first and second current parameters $I_1$ and $I_2$ in step 206. If the average charging current $I_{av}$ is less than the current parameter $I_1$ and greater than the second current limit $I_2$, i.e. in the transition region, then the resistance free set-point voltage $SV_r$ is adjusted according to the function in step 208. When a variable reference set-point voltage $SV_r$ is utilized, the function increases the set-point voltage level as the charging current decreases, i.e. the battery becomes charged. On the other hand, if the average value $I_{av}$ for the charging current is not within the transition region, then the resistance free set-point voltage $SV_r$ is set to the value of $V_{r2}$ from the parameter table in step 210.

Once the value for the resistance free set-point voltage $SV_r$ is determined, the voltage is temperature compensated in step 212. The temperature compensated resistance free set-point voltage $SV_{ref}$ is compensated as a function of the measured battery temperature T, the reference temperature parameter $T_{ref}$ and the temperature compensation coefficient θ as shown in step 212. (The charging current I is the value being supplied by the programmable power supply 6 (FIG. 1), and the battery temperature T is read from the battery temperature sensor 20 through the A/D converter 24.) The temperature compensated resistance free set-point (i.e. reference) voltage $SV_{ref}$ is compared with the calculated resistance free voltage $V_{RF}$ as will be described with reference to step 144 in FIG. 5.

Next, in step 214, a decision is made to interrupt the charging current I. According to one aspect of the invention, the charging current I is periodically interrupted. Further according to the invention, the charging current I is interrupted but maintained at a positive value as shown in FIG. 2. It is a feature of the invention that maintaining the current I at a positive value during the interruption prevents terminating the surface chemical reaction. During the interruption in the current I, the battery internal resistance R is calculated in step 216, and in step 218 the resistance free voltage $V_{RF}$ is calculated.

Referring to FIG. 2, prior to turning the charging current I LOW, readings for voltage $V_{Hi}$ and current $I_{Hi}$ are taken. Following the current I going LOW, voltage and current readings $V_{Low}, I_{Low}$, are taken for determining the resistance free voltage $V_{RF}$F. Preferably, the readings are taken 0–100 ms after the charging current I is turned LOW. The LOW value $I_{Low}$ (FIG. 2) for the charging current I may be preselected constant value during the entire charge cycle or set as a percentage (i.e. 0 to 100%) of the HIGH value.

Referring to FIG. 6, the battery internal resistance R is calculated according to the expression given in step 216. The calculation for the internal resistance R is made after the voltage and current readings $V_{Low}, I_{Low}$ are taken. The value for the battery internal resistance R is stored in memory.

Figure 3:
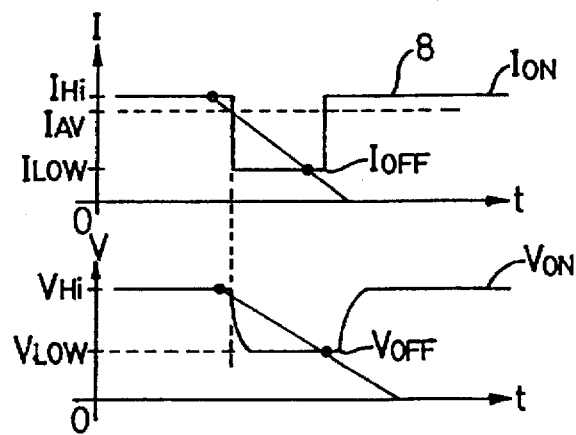
FIG. 3 shows a method for calculating resistance free reference voltage $V_{RF}$.

Next, the resistance free voltage $V_{RF}$ is calculated according to the expression in given in step 218. It is a feature of the present invention that the regulation of the charging current I is based on the resistance free voltage $V_{RF}$. Reference is made to FIG. 3 which shows a method for calculating the resistance free voltage $V_{RF}$ from the battery internal resistance R. According to this aspect of the invention, a change (i.e. transition 9 or 11 as shown in FIG. 2) is introduced into the charging current I in order to measure the actual internal resistance. The step change in the current I is defined by a HIGH current $I_{Hi}$ and a HIGH voltage $V_{Hi}$ and respective LOW current $I_{Low}$ and LOW voltage $V_{Low}$. As shown in FIG. 3, the step change in the current I causes a respective change in the battery voltage. The resistance free voltage $V_{RF}$ is calculated according to the following function:

$$V_{RF} = V_{Hi} - \frac{I_{Hi}(V_{Hi} - V_{Low})}{(I_{Hi} - I_{Low})}$$

The values for the voltages $V_{Hi}$ and $V_{Low}$ are determined by the controller 2 through readings taken from the battery voltage sensor 18 (FIG. 1), while the HIGH and LOW values for the step change in the current I are known to the controller 2 from the control loop for the power supply 6.

The resistance free voltage is preferably calculated after a preselected period of time after the charging current I is turned LOW. The frequency for interrupting the current is preferably kept in the range 0–10 Hz, but may be increased up to a value of 120 Hz.

As shown in FIG. 6, the resistance free voltage $V_{RF}$ is also calculated in step 220 without interrupting the current. In step 220, the resistance free voltage $V_{RF}$ is calculated as a function of the battery internal resistance R and the high voltage and current readings $V_{Hi}$ and $I_{Hi}$. The battery internal resistance R was calculated earlier and stored in memory. Since the internal resistance R of the battery 10 changes over the course of the charging cycle it is preferable to periodically recalculate and update the internal resistance R in step 216 when the charging current I is interrupted.

Once the resistance free voltage $V_{RF}$ is updated in step 218 or step 220, control returns to step 144 in FIG. 5. Between interruptions, the calculated resistance free voltage $V_{RF}$ is used to control the charging process of the battery 10 as will be described.

Step 144 comprises a decision step, where the resistance free voltage $V_{RF}$ is compared to the temperature compensated set-point resistance free voltage $SV_{RF}$ (obtained in step 212 of FIG. 6). If the resistance free voltage $V_{RF}$ is less than the set-point voltage $SV_{RF}$, then the battery 10 is not fully charged. According to the invention, the charging current I is adjusted in order to efficiently charge the battery 10.

Figure 10:
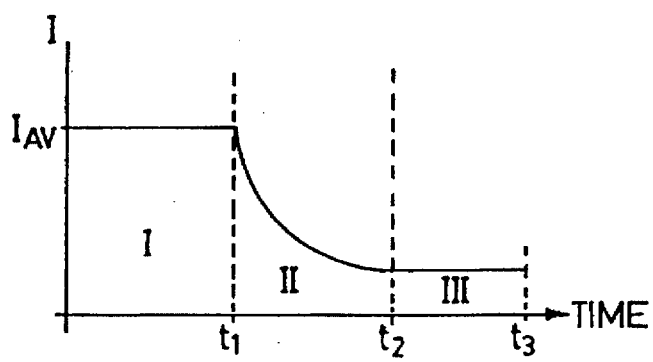
FIG. 10 shows a typical current waveform over a charging cycle according to the present invention.

As shown in FIG. 10, the charging cycle comprises three distinct regions I, II and III. Region I represents the high current period. Region II represents the regulation phase, and region III represents the finishing charge.

In region I, a high charging current I, typically >1 C, is applied to the battery. In region I, the battery charge acceptance ability exceeds the charging current, and therefore, the rate of charge is determined by the average charging current $I_{av}$. The high charging current I in region I results in high charge (Coulombic) efficiency and is beneficial to long battery life. Furthermore, during region I operation, the current I is limited by the charger 1 to a value which is safe for the battery electrode interconnections and internal wiring. Therefore, not reversing the charging current I in accordance with the present invention has the effect of maintaining the average current at the optimal level throughout the high current period.

Regulation of the charging current in region II prevents overcharging and potentially damaging the battery. During region II, the rate of charge is determined by the battery charge acceptance which is dependent on the surface chemical reaction or mass transport through the diffusion boundary layer in the electrolyte. Thus in region II operation, the charging current (i.e. average value) is reduced in accordance with the battery charge acceptance curve. Because the charging current is not reversed during the transition periods, the regulation of the current in region II does not have the undesired effect of reducing the net surface chemical reaction rate and the net transport flux through the boundary layer.

Region III comprises a finishing charge portion which entails applying a charging current I, typically in the range 0.05 C to 0.2 C. The purpose of the finishing charge is to equalize the charge in the cells of the battery and thereby prevent Reversible Capacity Decay. Due to the effect achieved by varying the current as described above, it is also possible to minimize or forego the finishing charge stage entirely without encountering Reversible Capacity Decay.

Referring back to step 146 in FIG. 5, the status indicator LCA is checked and the charging current increment 8 is not adjusted if the calculated resistance free voltage $V_{RF}$ exceeds the set-point voltage $SV_{ref}$.

In step 148, the status indicator LCA is checked again to determine if the charging current I has reached its maximum value indicated by LCA=2. If TRUE, the charging current I is set to the maximum current value $I_{max}$ permissible for type of battery 10 being charged, and an "End of Charge" condition is checked for the charging cycle in step 162 (described below). If the charging current I is not at its maximum value, then the charging current I is ramped up in step 152. According to the invention, the effects to the resistance free voltage $V_{RF}$ and incremental voltages $\Delta V$ are taken into account when increasing the charging current I according to the ramping function.

The function for ramping the charging current I is described with reference to FIGS. 8 and 9. As shown in FIG. 9, a change in the charging current I causes a corresponding change in the incremental voltage $\Delta V_i$ which can be measured. There is also a change in voltage $\Delta V_t$ which is not current dependent and as shown in FIG. 9. The incremental voltage $\Delta V_t$ is determined by calculating three points, P1, P2, and P3, over a period defined as dwell time D1 and then extrapolating.

Figure 8:
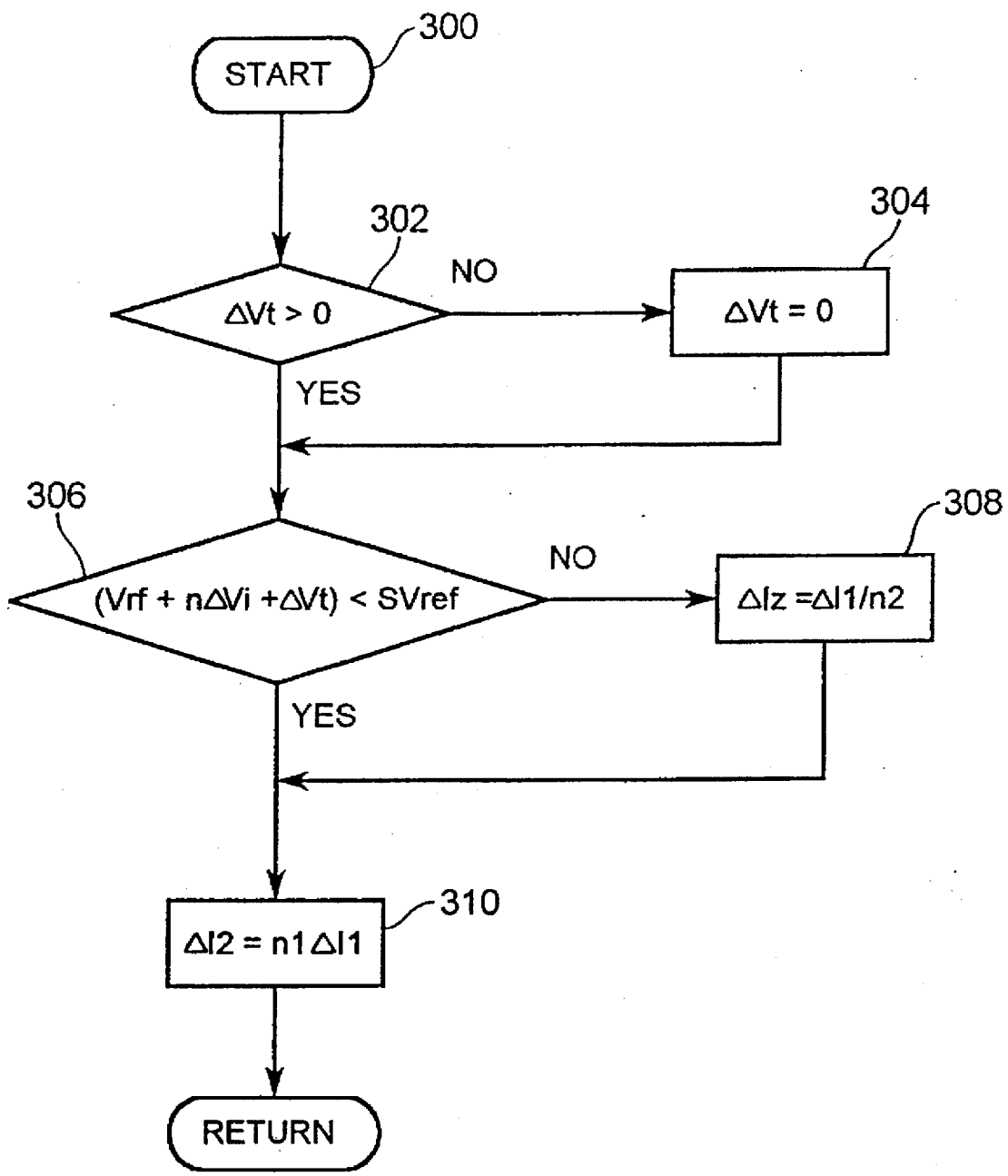
FIG. 8 is a flow chart showing a current ramp-up function according to the charging method of FIG. 5.
Figure 9:
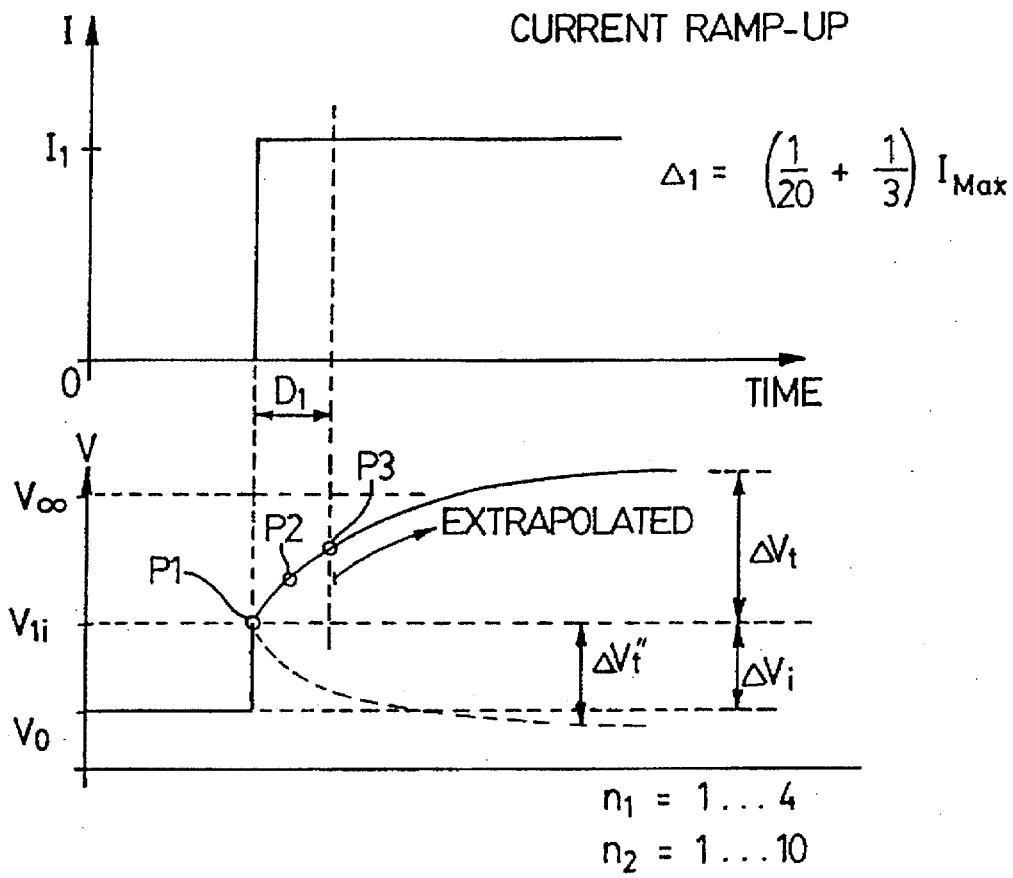
FIG. 9 shows current and voltage waveforms for the current ramp-up function of FIG. 8.

Referring to FIG. 8, the function starts at step 300 by ramping the charging current I (FIG. 9). In step 302 a decision is made based on the incremental voltage $\Delta V_t$. If the incremental voltage $\Delta V_t$ is not greater than zero, then it is set to zero in step 304. Otherwise, the change in the voltage caused by the change in the charging current I is compared to the temperature compensated set-point voltage $SV_{ref}$ in step 306. The voltage comprises the sum of the resistance free voltage $V_{RF}$ and the incremental voltages $\Delta V_i$ and $\Delta V_t$. In step 306, the value for the incremental voltage $\Delta V_i$ includes a coefficient "$n_1$" which has a value 1 . . . 4.

If the voltage sum in step 306 exceeds the set-point voltage $SV_{ref}$, there is a potential overcharge condition, and the increment or step change in the charging current I is decreased as represented by incremental current $\Delta I_2$. As shown in step 308, the incremental current $\Delta I_2$ is a function of incremental current $\Delta I_1$ and coefficient $n_2$. The coefficient $n_2$ takes values in the range 1 to 10.

If the voltage sum in step 306 does not exceed the temperature compensated set-point voltage $SV_{ref}$ then it is safe to increase the charging current I. In step 310, the charging current I is increased in increments represented by $\Delta I_2$ as a function of the change in current $\Delta I_1$ multiplied by coefficient $n_1$ where $n_1$ takes a value 1 . . . 4. At step 312, control returns to step 154 shown in FIG. 5.

Referring to FIG. 5, step 154 comprises a decision block where the ramped-up charging current I is compared to the allowable maximum current $I_{Max}$. If the charging current I is still less than the maximum $I_{Max}$, then the charging cycle continues. If the charging current I exceeds the maximum, then the status indicator is set to TWO in step 156, and the charging cycle continues.

In step 144, if the resistance voltage $V_{RF}$ is approaching the set-point voltage $SV_{ref}$, the status indicator LCA is set to THREE in step 158, and in step 160, the charging current I is adjusted as a function of the resistance free voltage $V_{RF}$. The charging current I is incrementally decreased to follow the battery charge acceptance curve, i.e. according to region II operation in FIG. 10. According to the invention, the method for controlling the charging current in region II include:

(1) supplying an uninterrupted charging current I and controlling the magnitude of the current I on the basis of the calculated internal resistance;
(2) varying the magnitude of the charging current $I_{ON}$;
(3) varying the ON and OFF times, i.e. the duty cycle, of the charging current I for the duration of region II at a constant repetition rate;
(4) varying the ON time of the charging current I while maintaining the OFF time constant;
(5) a combination of (2) and (3); or (6) a combination of (2) and (4).

Figure 7:
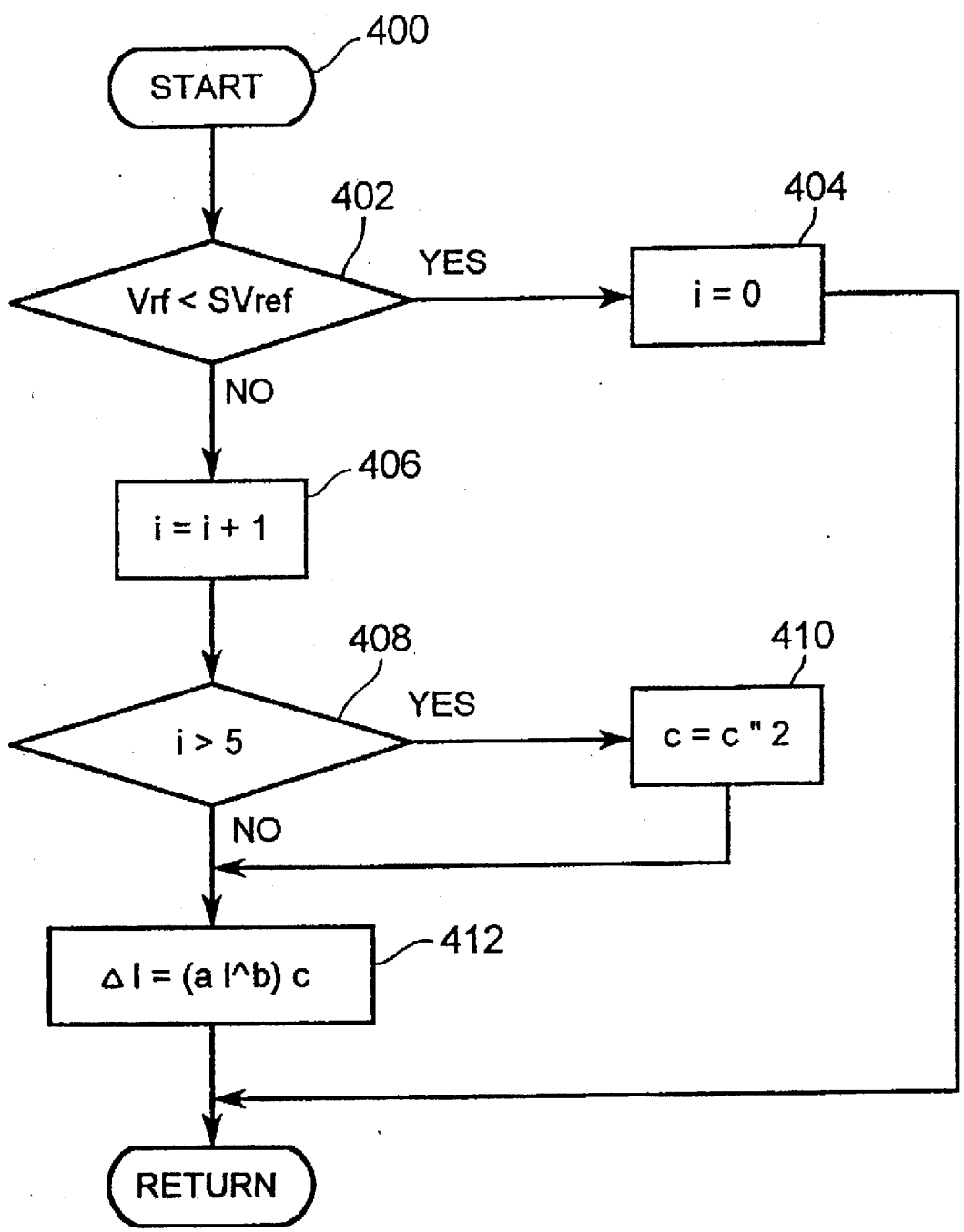
FIG. 7 is a flow chart showing another aspect of the charging method of FIG. 5.

The function for controlling the charging current I is shown in FIG. 7.

Referring to FIG. 7, starting at step 400, the resistance free voltage $V_{RF}$ is compared to the set-point voltage $SV_{ref}$. If the resistance free voltage $V_{RF}$ exceeds the set-point $SV_{ref}$, the current decrement i is set to zero in step 404, and the function returns. Otherwise, the current decrement i is increased by one in step 406. In step 408, the current decrement i is tested and if it is greater than 5, a safety coefficient c is increased in step 410. In step 412, the incremental change to the charging current ΔI is calculated as a function of the current decrement and the safety coefficient c as shown. The parameters "a" and "b" are coefficients obtained from the parameter and are defined empirically according to the battery type.

Next in step 162, the end of the charging cycle is checked. The end of charging cycle is determined by looking at one or more selected parameters. The parameters include the elapsed charge time τ, the value for the Coulombic charge Q, the value for charging current compared to the minimum charging current $I_{min}$, and the rate of change in the battery voltage dV/dτ. For example, if the charging current being applied to the battery has tapered to the minimum value $I_{min}$, then it is assumed that the battery has been charged, i.e. it cannot accept further charge. Similarly in Region III, if the rate of change of battery voltage, i.e. dV/dτ, is essentially zero, then it is assumed that the battery is charged.

On the basis of an end of charge condition in step 162, a normal end of charge sequence is initiated in step 162. If a finishing charge, i.e. region III (FIG. 10), is being applied, then end of charge corresponds to termination of the finishing charge sequence. The end of charge sequence includes an orderly shut down of the programmable power supply 6 (FIG. 1), i.e. the charging current I, and other hardware devices, followed by displaying a notification message on the panel 4.

If the end of the cycle has not been reached, the charging process continues and the safety limits are checked in step 166. The safety check in step 166 ensures that the charging cycle is still proceeding within the prescribed safety limits. The parameters checked in step 166 include the maximum allowable voltage $V_{max}$, the minimum voltage $V_{min}$, the maximum allowable battery temperature $T_{max}$, the maximum allowable charging time $τ_{max}$, the maximum allowable Coulombic charge $Q_{max}$, the battery internal resistance R, and the battery pressure p. The maximum allowable values for these parameters depend on the electrochemical characteristics of the battery being charged, and may be conveniently stored in the parameter table.

If one of the safety limits is exceeded in step 166, a fault condition is entered in step 170, and the charging cycle is terminated. The termination of the charging cycle is indicated on the display panel 4.

On the other hand, if the safety limits have not been exceeded, the charging cycle continues and the process control parameters and data are updated in step 168. The control parameters and data control the magnitude and application (i.e. variation) of the charging current to the battery. The control parameters are then passed to the real time control module 128 in order to control the hardware devices, e.g. programmable power supply 6.

Although the present invention is described with the charging current I being maintained at a positive and non-zero value, there are instances in which the charging current I may be turned off or reversed, i.e. brought negative. For example, if diagnostics are being performed to locate a bad cell, the current is reversed to bring the cells back to the open cell voltage, as part of the diagnostics operation. Thus, while substantially maintaining the charging current I at a non-zero value is a feature of the present invention, it will be appreciated that the charging current may occasionally be made negative.

The present invention may be embodied other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for charging a rechargeable battery, said apparatus comprising:
    generator means for generating a charging current having a variable level, and during a first charging period said current having a level to rapidly charge the battery at a rate in amperes greater than the capacity in ampere-hours of the battery;
    controller means for controlling said generator means, said controller means including,
    (a) means for varying said charging current for a predetermined variation interval and during said variation interval said charging current being maintained at a non-zero, non-negative value;
    (b) means for determining a resistance free voltage value for the battery during said variation interval;
    (c) means for comparing a reference voltage to said resistance free voltage value for the battery;
    (d) means for controlling the level of said charging current in response to said resistances free voltage.

2. The apparatus as claimed in claim 1, wherein said charging current is periodically interrupted at a rate dependent on the charge state of said battery.

3. The apparatus as claimed in claim 1, wherein said variation interval has a duration of up to about 500 milliseconds.

4. The apparatus as claimed in claim 1, wherein said means for varying varies said charging current when said resistance free voltage reaches predetermined percentages of said reference voltage.

5. The apparatus as claimed in claim 4, wherein said predetermined percentages comprise 92%, 96%, 98% and 99%.

6. The apparatus as claimed in claim 5, wherein said variation interval has a duration of up to about 500 milliseconds.

7. The apparatus as claimed in claim 1, wherein said means for determining the resistance free voltage value includes means for inputting high and low voltage readings and high and low current readings during said variation interval, and means for calculating a resistance free voltage value from said input voltage and current readings.

8. The apparatus as claimed in claim 1, wherein said means for determining the resistance free voltage value includes means for inputting high and low voltage readings and high and low current readings during said variation interval, and means for calculating an internal resistance for the battery from said input voltage and current readings.

9. The apparatus as claimed in claim 8, wherein said means for determining the resistance free voltage value further includes means for calculating a resistance free voltage value from said internal resistance value and said high voltage and current readings.

10. The apparatus as claimed in claim 7, wherein said resistance free voltage is calculated according to the expression:

$$V_{RF} = V_{Hi} - \frac{I_{Hi}(V_{Hi} - V_{Low})}{(I_{Hi} - I_{Low})}.$$

11. The apparatus as claimed in claim 8, wherein said internal resistance value is calculated according to the expression:

$$R = (V_{Hi} - V_{Low})/(I_{Hi} - I_{Low}).$$

12. The apparatus as claimed in claim 9, wherein said resistance free voltage is calculated according to the expression:

$$V_{RF} = V_{Hi} - R\, I_{Hi}.$$

13. The apparatus as claimed in claim 3, wherein said current comprises two or more levels during said variation interval, and said levels having predetermined durations.

14. The apparatus as claimed in claim 13, wherein during said variation interval said current has a fall and rise time in the range of about from 0.01 C/ms to 10 C/ms.

15. The apparatus as claimed in claim 1, wherein said means for determining a resistance free voltage includes means for reading a value for said resistance free voltage, and said reading being started 1 ms after commencement of said variation interval.

16. The apparatus as claimed in claim 1, wherein said means for controlling the current includes means for providing a current with a constant level for a predetermined time.

17. The apparatus as claimed in claim 1, wherein said means for controlling maintains the level of said charging current so that the resistance free voltage for the battery approaches the reference voltage.

18. The apparatus as claimed in claim 17, wherein said means for controlling the level of said charging current includes means for incrementally decreasing the level of said charging current when said resistance free voltage approaches said reference voltage.

19. A method for charging a rechargeable battery comprising the steps of:

(a) generating a charging current having a variable level;
(b) maintaining said charging current during a first charging period at a level to rapidly charge the battery at a rate in amperes greater than the capacity in ampere-hours of the battery;
(c) changing said charging current for a predetermined variation interval;
(d) maintaining said charging current at a non-zero, non-negative value during said variation interval;
(e) determining a resistance free voltage value for the battery after said change; and
(f) varying the level of said charging current in response to said resistance free voltage value determined in step (e).

20. The method as claimed in claim 19, wherein said step of varying the level of said charging current comprises comparing said resistance free voltage value for the battery to a reference voltage and decreasing the level of said charging current if said resistance free voltage value exceeds said reference voltage.

21. The method as claimed in claim 19, wherein said charging current is changed at a rate dependent on the charge state of the battery.

22. The method as claimed in claim 21, wherein said variation interval has a duration of up to about 500 milliseconds.

23. The method as claimed in claim 19, wherein said step of changing said charging current comprises changing the level of said charging current when said resistance free voltage determined for the battery reaches predetermined percentages of a reference voltage.

24. The method as claimed in claim 23, wherein said predetermined percentages comprise 92%, 96%, 98% and 99%.

25. The method as claimed in claim 24, wherein said variation interval has a duration of up to about 500 milliseconds.

26. The method as claimed in claimed 19, wherein said step for determining a resistance free voltage value for the battery comprises inputting high and low voltage readings and high and low current readings for the battery during said variation interval, and calculating a resistance free voltage value from said input voltage and current readings according to the expression:

$$V_{RF} = V_{Hi} - \frac{I_{Hi}(V_{Hi} - V_{Low})}{(I_{Hi} - I_{Low})}.$$

27. The method as claimed in claim 19, further includes the step of determining an internal resistance for the battery comprising inputting high and low voltage readings and high and low current readings for the battery during said variation interval, and calculating an internal resistance value for the battery from the input voltage and current readings according to the expression, $$R = (V_{Hi} - V_{Low})/(I_{Hi} - I_{Low}).$$

28. The method as claimed in claim 27, wherein said step for determining a resistance free voltage value for the battery comprises calculating a value for the resistance free voltage according to the expression:

$$V_{RF} = V_{Hi} - R\, I_{Hi}.$$

29. A method for determining a resistance free voltage value during the charging cycle when a charging current is applied to a rechargeable battery, said method comprising the steps of:

(a) varying said charging current for a predetermined interval;

(b) inputting high and low voltage readings and high and low current readings for the battery during said predetermined interval; and (c) calculating a resistance free voltage value from said input voltage and current readings according to the expression:

$$V_{RF} = V_{Hi} - \frac{I_{Hi}(V_{Hi} - V_{Low})}{(I_{Hi} - I_{Low})}.$$

30. The method as claimed in claim 29, wherein said step of varying the charging current comprises reducing the magnitude of said charging current to a non-negative value during said predetermined interval.

31. The method as claimed in claim 30, wherein said charging current is varied at a rate dependent on the charge state of the battery.

32. The method as claimed in claim 31, wherein said predetermined interval has a duration of up to about 500 milliseconds.

33. The method as claimed in claim 29, wherein said step of varying the charging current comprises reducing the magnitude of said charging current to a plurality of non-negative values of predetermined durations during said predetermined interval.

* * * * *